United States Patent

Bescoby et al.

[11] Patent Number: 5,102,305
[45] Date of Patent: Apr. 7, 1992

[54] TURBOMACHINE HAVING A UNITARY CERAMIC ROTATING ASSEMBLY

[75] Inventors: Frank A. Bescoby, Rancho Palos Verdes; David M. Kotchick, San Pedro; Stanley C. Pollitt, Rancho Palos Verdes, all of Calif.

[73] Assignee: Allied-Signal Inc., Morris Township, Morris County, N.J.

[21] Appl. No.: 283,654

[22] Filed: Dec. 13, 1988

[51] Int. Cl.$^5$ .............................................. F04B 17/00
[52] U.S. Cl. ................................. 417/407; 416/241 B
[58] Field of Search ................... 417/405, 406, 407; 60/39.83; 416/241 B, 244 A; 384/277, 278, 476, 493, 900, 99

[56] References Cited

U.S. PATENT DOCUMENTS

| | | | |
|---|---|---|---|
| 2,440,890 | 1/1941 | Birmann | 384/320 |
| 3,612,628 | 10/1971 | Steele | 416/241 B |
| 4,133,585 | 1/1979 | Licht | 384/103 |
| 4,176,519 | 12/1979 | Kronogard | 416/241 B |
| 4,281,941 | 8/1981 | Rottenkolber | 416/241 B |
| 4,541,786 | 9/1985 | McLean | 417/407 |
| 4,629,397 | 12/1986 | Schweitzer | 416/241 B |
| 4,636,434 | 1/1987 | Okamura et al. | 428/328 |
| 4,761,117 | 8/1988 | Oda et al. | 417/407 |
| 4,784,574 | 11/1988 | Tsuno et al. | 416/241 B |

FOREIGN PATENT DOCUMENTS 2507512 10/1976 Fed. Rep. of Germany ... 416/241 B

Primary Examiner—Louis J. Casaregola
Assistant Examiner—Timothy S. Thorpe
Attorney, Agent, or Firm—David B. Abel; Terry L. Miller; Robert A. Walsh

[57] ABSTRACT

A turbomachine having a unitary ceramic rotating assembly mounted within a split housing. The rotating assembly includes at least a turbine and integral shaft, the shaft providing a cooled bearing support surface for a fluid film foil bearing.

14 Claims, 2 Drawing Sheets

FIG. 1
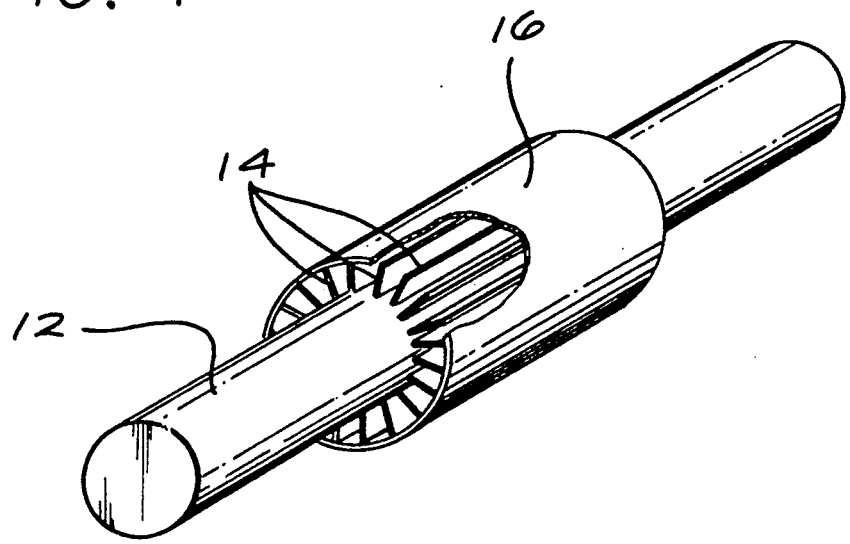
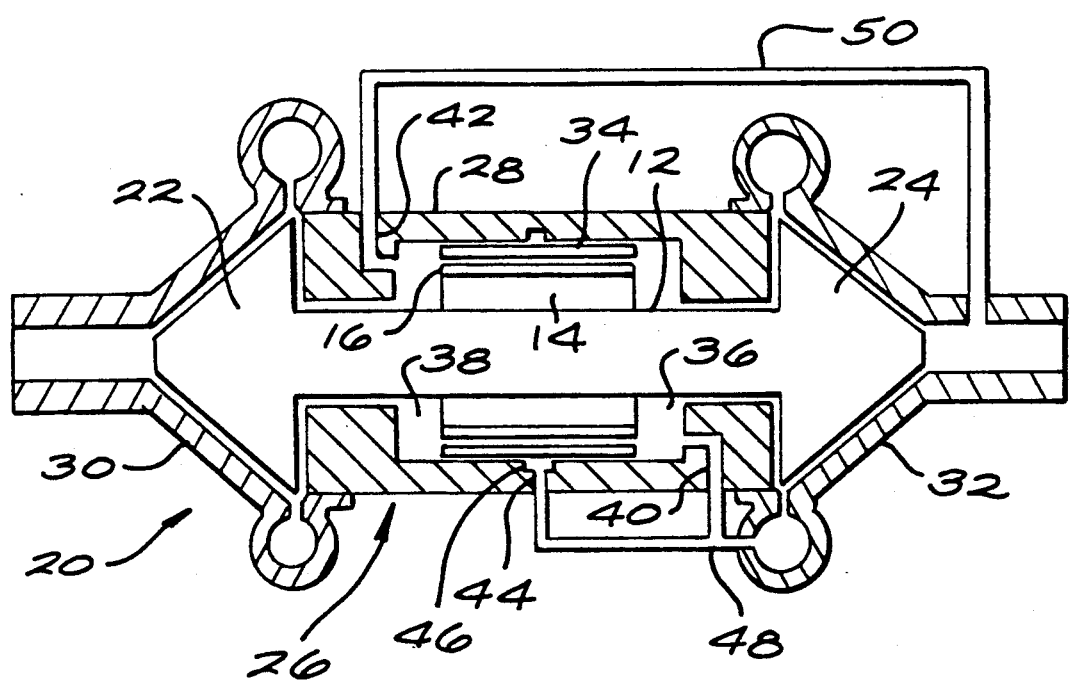
FIG. 2

TURBOMACHINE HAVING A UNITARY CERAMIC ROTATING ASSEMBLY

This invention relates to the field of ceramic turbomachinery, and in particular to an apparatus providing a unitary ceramic rotating assembly including a turbine, a shaft and a compressor for a turbomachine, the turbomachine incorporating a process fluid bearing to support the unitary ceramic rotating assembly.

BACKGROUND OF THE INVENTION

The high temperature resistance and chemically nonreactive properties of ceramics make ceramic components a desirable replacement for traditionally metal components. A particular example of this can be found in the turbomachinery field, where ceramic turbine wheels have begun to replace metallic turbine wheels within turbochargers for motor vehicles. Ceramic turbine wheels can operate at higher temperatures, are lower in weight and inertia, and are chemically nonreactive, thus making them superior to their metallic counterparts.

However, ceramics have certain properties which make it difficult to support a ceramic shaft, which for example may extend from a ceramic turbine wheel, with traditional bearing systems such as lubricated ball bearings or journal bearings. In addition, known ceramics capable of operating at very high temperatures are relatively good conductors of heat. When the turbine wheel is formed integral with the shaft, heat is conducted from the turbine wheel along the shaft causing bearing surfaces to become very hot. When these shafts are supported by oil lubricated ball or journal bearings, the high temperature of the shaft may cause coking of the oil. This coking will rapidly lead to failure of the bearing and ultimately turbomachine.

In certain applications, fluid film gas bearings utilizing metal foils to support a shaft on a hydrodynamic film of gas have replaced ball bearings and journal bearings. Example of these types of process fluid bearings, include U.S. Pat. Nos.: 3,893,733; 3,957,317; 4,153,315; 4,178,046, 4,195,395; 4,475,824; 4,502,795; 4,621,930; and 4,624,583.

In the operation of these fluid film gas bearings, at startup and rundown, there is actual contact between the foils and the bearing surfaces. In order to lower startup friction and prevent wearing of the contact surfaces, the foils may be coated with a lubricant material such as a fluorinated hydrocarbon polymer, graphite, or molydenum disulfide. Examples of patents specifically directed to foil coatings are U.S. Pat. Nos.: 3,677,612; 4,005,914; 4,178,046; 4,435,839; and 4,459,047.

These types of fluid bearings would be an ideal match for ceramic shafts except for soak back heating of the shaft from the turbine wheel. The various lubricant materials in use as well as the metal foils are susceptible to damage at elevated temperatures. Heretofore ceramic turbines have been attached to metallic shafts driving metallic compressors. A unitary ceramic turbine, shaft and compressor has not been available.

SUMMARY OF THE INVENTION

This invention provides a unitary ceramic rotating assembly for a turbomachine. The rotating assembly is mounted within a split housing and is supported on foil bearings. The rotating assembly includes a turbine and a shaft, and may additionally include a compressor. The shaft of the rotating assembly includes a fluid bearing runner supported by a fin matrix. Process fluid or ambient air ducted into the split housing is directed through the fin matrix to cool the bearing runner and foil bearing.

BRIEF DESCRIPTION OF THE DRAWINGS

FIG. 1 is a perspective view of a ceramic shaft including the fin matrix and bearing runner of the present invention.

FIG. 2 is a cross sectional view of a turbomachine including the ceramic shaft of FIG. 1.

DETAILED DESCRIPTION OF THE INVENTION

Figure 3:
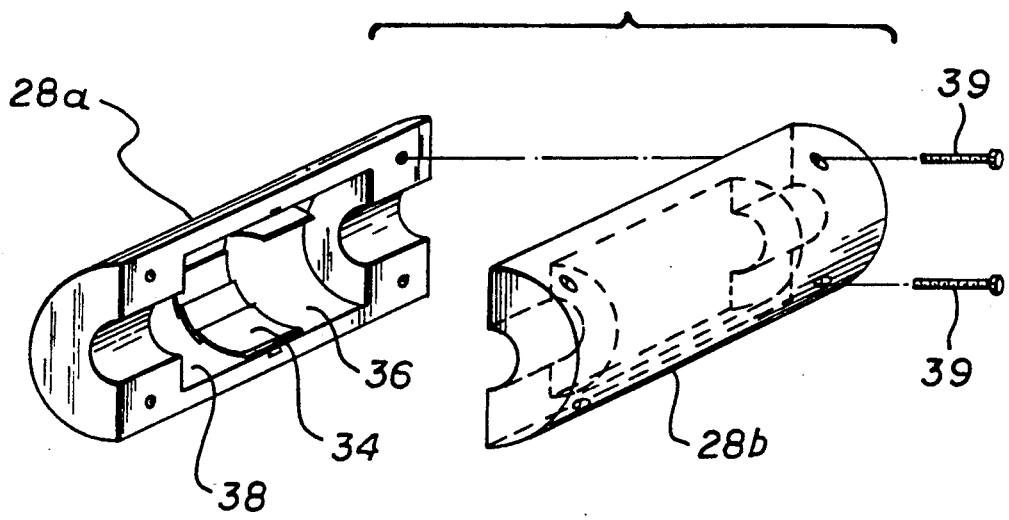
FIG. 3 is a perspective view of the split central housing section of FIG. 2.

FIG. 1 perspectively shows a ceramic shaft 12 having a plurality of fins 14 extending radially outward from a central portion thereof. A bearing runner 16 in the shape of a thin cylindrical sleeve is mounted at the radially outward ends of the fins 14, bearing runner 16 being axially concentric with the ceramic shaft 12. The shaft 12 is part of the unitary rotating assembly 18 shown incorporated within a turbomachine 20 in FIG. 2. The unitary rotating assembly 18 includes the ceramic shaft 12, fins 14, and bearing runner 16 as well as a turbine 22 and a compressor 24 attached to opposite ends of the ceramic shaft 12, all mounted within a housing 26. tHE HOUSING 26 includes a split central body 28, a turbine scroll 30, and a compressor scroll 32. The split central body 28 contains a fluid bearing 34 mounted therein and positioned radially outward from the bearing runner 16 of the rotating assembly 18. Annular cavities 36, 38 are defined within the split central body 28 at opposite axial ends of the bearing runner 16. The split central body 28 is shown perspectively in FIG. 4 prior to assembly as including two half sections 28a, 28b which are secured together by bolts 39.

The turbomachine 20 operates on a flow of high pressure fluid which is directed upon the turbine 22 which extracts useful work therefrom. The turbine 22 in turn drives the compressor 24 which pressurizes a fluid from a first low pressure source to a higher pressure. Within the central body 28 the fluid bearing 34 utilizes the rotation of the shaft 12 and bearing runner 16 to produce a hydrodynamic film of fluid between the fluid bearing 34 and the bearing runner 16 to support the shaft 12.

In order to provide a flow of cooling fluid to the matrix of fins 14 as well as the fluid bearings 34, the central body may include first, second and third passageways 40, 42, 44. The first passageway 40 extends through the central body 28 to the annular cavity 36. The second passageway 42 extends through the central body 28 to the annular cavity 38. The third passageway extends through the central body 28 and connects to an annular plenum 46 which distributes air circumferentially about the fluid bearing 34. The first and third passageways 40, 44 are connected via a conduit 48 to a source of pressurized air which may be taken from downstream of the compressor 24. In order to recirculate the process fluid, the second passageway 42 is connected to a second conduit 50 which returns the process fluid to a low pressure location upstream of the compressor 24. By this assembly, pressurized process fluid flows into annular cavity 36, through the fins 14 to annular cavity 38, thereby the fins 14 act as a heat exchanger, reducing heat transfer to the bearing runner 16. Alternatively, the first and third passageways 40, 44 may be opened to the atmosphere, allowing ambient air to cool the fins 14.

Figure 4:
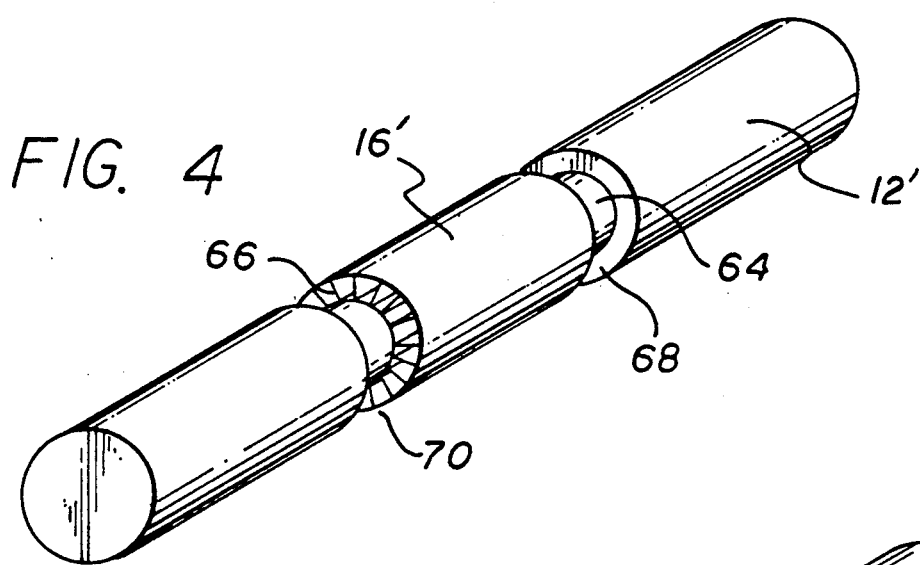
FIG. 4 is a perspective view of a ceramic shaft having an incorporated fin matrix and bearing runner.

FIG. 4 is another embodiment of the invention wherein the bearing runner 16' has the same diameter as the major portions of the ceramic shaft 12'; and the ceramic shaft 12' has a stepped section 64 having a reduced diameter. The fin matrix 66 extends from the reduced diameter to the bearing runner 16'. Slots 68 and 70 on opposite ends of the matrix of the fins 66 allow cooling fluid to enter and exit from the matrix of fins 66.

Figure 5:
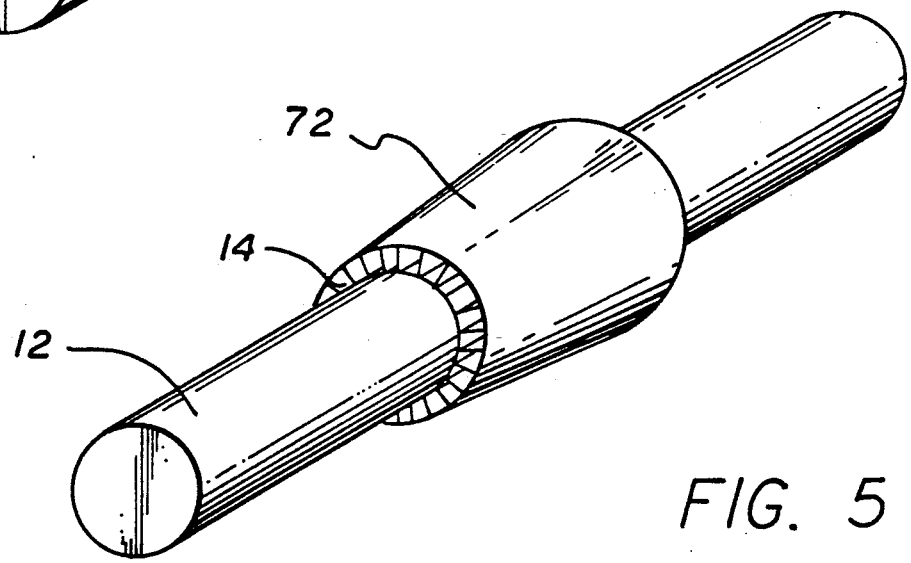
FIG. 5 shows an alternate embodiment for the bearing runner wherein both axial and radial bearing support is provided.

FIG. 5 shows a cross sectional view along the axis of the shaft assembly wherein a bearing runner 72 is conically shaped, such that both axial and radial bearing support may be provided to the ceramic shaft 12. This arrangement eliminates the need for an additional thrust bearing within the turbomachine 20.

For all of the above embodiments, the unitary rotating assembly is formed from ceramic materials. Preferred ceramics include Silicon Carbide and Silicon Nitride, however other structural ceramics are also contemplated by the invention. To form the structural elements, selected ceramic particles are mixed with a plasticizer and binder within a mixer. For the shaft 12 as well as the turbine 22, and compressor 24, binder and plasticizer in approximately equal amounts having a volume percentage of from approximately 20% to 40% by weight is used. For the fins 14 and bearing runner 16 excess binder or organic filler is incorporated. The green state shaft 12, turbine 22, and compressor 24 are formed by a slip coating processes. The green state fins 14 and bearing runner 16 are formed by any of the processes including extrusion or calendering, or alternatively slip cast simultaneously with the shaft. In the case where the fins 14 and bearing runner 16 are formed separately from the shaft 12, a solvent may be used to enhance the attachment of the fins 14 to the shaft 12 when the bearing runner 16 and fin matrix 14 is wrapped around the shaft 12. The solvent acts to partially dissolve the binder, which then reforms, binding the fins 14 to the shaft 12 when the solvent vaporizes.

The structure is then processed within a furnace by a binder extraction cycle, followed by a densification cycle. The densification cycle is preferably a reaction bonding process within a nitrogen atmosphere. However, other densification processes including sintering or hot isostatic pressing either exclusively or in any combination of the three methods may be used. In the preferred embodiment, the densification results in the shaft 12, turbine 22 and compressor 24 attaining a density greater than 85% of theoretical maximum density, and preferably of between from 94% to 100% of theoretical, while the fins and bearing runner may attain a density of less than 85% of theoretical. Since the thermal conductivity of ceramics is related to the density, it may be appreciated that the thermal conductivity of the fins 14 and bearing runner 16 will be less than that of the shaft 12.

It should be evident from the foregoing description that the present invention provides many advantages for ceramic shaft support systems. Although preferred embodiments are specifically illustrated and described herein, it will be appreciated that many modifications and variations of the present invention are possible in light of the above teaching to those skilled in the art. It is expected, therefore, that the present invention be limited only by the appended claims.

We claim:

1. A turbomachine comprising:
    a ceramic turbine for extracting useful work from a flow of high temperature fluid, said turbine including a unitary ceramic shaft extending therefrom;
    a plurality of ceramic fins extending from a section of said shaft;
    a ceramic bearing sleeve axially concentric with said shaft and supported by said plurality of fins, said fins and said bearing sleeve integrally formed with said shaft;
    means for consuming said useful work of said turbine;
    housing means for containing said turbine, said shaft, said fins, and said sleeve, and for directing said flow of high temperature fluid upon said turbine; and
    fluid film gas bearing means, mounted between said housing and said sleeve for supporting said shaft and said turbine.

2. The turbomachine of claim 1 further comprising:
    means for directing a flow of gaseous cooling fluid through passageways between said plurality of fins.

3. The turbomachine of claim 1 wherein said turbine and said shaft are formed from a first ceramic composite having a relatively high co-efficient of thermal conductivity and said fins and said sleeve are formed from a second ceramic composite having a relatively low co-efficient of thermal conductivity.

4. The turbomachine of claim 3 wherein said first ceramic composite is a silicon nitride based composite densified to greater than 85 percent of theoretical and said second ceramic composite is a silicon nitride based composite densified to less than 85 percent of theoretical.

5. The turbomachine of claim 4 wherein said first ceramic composite is densified to greater than 94 percent of theoretical.

6. A turbomachine comprising:
    a ceramic turbine for extracting useful work from a flow of high temperature fluid, said turbine including a unitary ceramic shaft extending therefrom;
    a plurality of ceramic fins extending from a section of said shaft;
    a ceramic bearing sleeve axially concentric with said shaft and supported by said plurality of fins;
    compressor means integrally formed with said turbine and said shaft for compressing gaseous fluid from a first pressure to a second higher pressure;
    housing means for containing said turbine, said shaft, said fins, and said sleeve, and for directing said flow of high temperature fluid upon said turbine; and
    fluid film gas bearing means, mounted between said housing and said sleeve for supporting said shaft and said turbine.

7. The turbomachine of claim 6 further comprising
    means for conducting a portion of said pressurized gaseous fluid to an annular cavity at one end of said fins and said sleeve; and
    means for ducting pressurized gaseous fluid from a second annular cavity at an opposite end of said fins and said sleeve to a lower pressure location.

8. The turbomachine of claim 1 further comprising:
means for providing a flow of process fluid to said fluid film gas bearing means.

9. The turbomachine of claim 6 wherein said housing means comprises:
a split central body having two sections attached to one another about said shaft;
a turbine scroll attached to the turbine end of said split central body; and
a compressor scroll attached to the compressor end of said split central body.

10. A turbomachine comprising:
a unitary ceramic rotating assembly including turbine, shaft, and compressor sections, said shaft further including a plurality of fins extending from a section of said shaft;
a fluid film gas bearing means for providing radial support to said rotating assembly;
a bearing sleeve axially concentric with said shaft and supported by said plurality of fins, said bearing sleeve providing a bearing runner surface for said fluid film gas bearing means;
a split housing means for containing said rotating assembly and for conducting working fluids to and from said turbine and said compressor.

11. The turbomachine of claim 10 wherein said film bearing means is configured for providing both radial and axial support to said rotating assembly.

12. The turbomachine of claim 10 further comprising:
means for directing a flow of gaseous cooling fluid through passageways between said plurality of fins.

13. The turbomachine of claim 10 wherein said turbine, said shaft, and said compressor are formed from a first ceramic composite having a relatively high co-efficient of thermal conductivity and said fins and said sleeve are formed from a second ceramic composite having a relatively low co-efficient of thermal conductivity.

14. The turbomachine of claim 13 wherein said first ceramic composite is a silicon nitride based composite densified to greater than 85 percent of theoretical and said second ceramic composite is a silicon nitride based composite densified to less than 85 percent of theoretical.

* * * * *